(12) United States Patent
Ranjan et al.

(10) Patent No.: US 11,001,477 B2
(45) Date of Patent: May 11, 2021

(54) ELEVATOR LINEAR PROPULSION SYSTEM WITH COOLING DEVICE

(71) Applicant: OTIS ELEVATOR COMPANY, Farmington, CT (US)

(72) Inventors: Ram Ranjan, West Hartford, CT (US); Enrico Manes, Feeding Hills, MA (US); Bryan Robert Siewert, Farmington, CT (US); Zbigniew Piech, Cheshire, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 622 days.

(21) Appl. No.: 15/748,839

(22) PCT Filed: Aug. 5, 2016

(86) PCT No.: PCT/US2016/045748
§ 371 (c)(1),
(2) Date: Jan. 30, 2018

(87) PCT Pub. No.: WO2017/027365
PCT Pub. Date: Feb. 16, 2017

(65) Prior Publication Data
US 2018/0215587 A1    Aug. 2, 2018

Related U.S. Application Data

(60) Provisional application No. 62/202,515, filed on Aug. 7, 2015.

(51) Int. Cl.
*B66B 11/00* (2006.01)
*B66B 11/04* (2006.01)
(Continued)

(52) U.S. Cl.
CPC ............ *B66B 11/0407* (2013.01); *H02K 9/18* (2013.01); *H02K 9/22* (2013.01); *H02K 41/03* (2013.01)

(58) Field of Classification Search
CPC .......... B66B 9/00; B66B 11/00; B66B 1/405; B66B 2201/216; B66B 5/021; B66B 5/04; Y02B 50/00; B60P 1/02
See application file for complete search history.

(56) References Cited

U.S. PATENT DOCUMENTS

| 5,519,266 A | 5/1996 | Chitayat |
| 5,668,421 A | 9/1997 | Gladish |

(Continued)

FOREIGN PATENT DOCUMENTS

| JP | H02241349 A | 9/1990 |
| JP | H07300286 A | 11/1995 |

(Continued)

OTHER PUBLICATIONS

Office Action regarding Chinese Application No. 201680046514.8 dated May 7, 2019; 10 pages.

(Continued)

*Primary Examiner* — Marlon T Fletcher
(74) *Attorney, Agent, or Firm* — Cantor Colburn LLP

(57) ABSTRACT

An elevator system includes an elevator car constructed and arranged to travel in a hoistway. A linear propulsion system of the elevator system is configured to impart a force upon the elevator car to control movement of the car. The linear propulsion system includes a secondary portion mounted to the elevator car and having a plurality of magnets. A first primary portion of the linear propulsion system includes a mounting assembly, a plurality of coils engaged to the mounting assembly, and a first cooling device including at (Continued)

least one conduit projecting outward from the mounting assembly and into the hoistway for transferring heat.

20 Claims, 8 Drawing Sheets

(51) Int. Cl.
*H02K 9/18* (2006.01)
*H02K 9/22* (2006.01)
*H02K 41/03* (2006.01)

(56) References Cited

U.S. PATENT DOCUMENTS

| | | | |
|---|---|---|---|
| 6,300,691 B1 | 10/2001 | Hwang et al. | |
| 6,305,501 B1 | 10/2001 | Kahkipuro et al. | |
| 6,313,550 B1 | 11/2001 | Binnard et al. | |
| 6,323,567 B1 | 11/2001 | Hazelton et al. | |
| 6,570,273 B2 | 5/2003 | Hazelton | |
| 7,019,421 B1 | 3/2006 | Hall et al. | |
| 8,791,607 B2 | 7/2014 | Boletis et al. | |
| 9,950,902 B2* | 4/2018 | Piech | H02K 41/031 |
| 10,118,799 B2* | 11/2018 | Piech | B66B 11/0407 |
| 10,196,240 B2* | 2/2019 | Piech | B66B 9/02 |
| 2005/0285451 A1 | 12/2005 | Kubo et al. | |
| 2006/0163008 A1* | 7/2006 | Godwin | B66B 9/003 187/288 |
| 2008/0149303 A1 | 6/2008 | Chang et al. | |
| 2013/0140372 A1 | 6/2013 | Mahadeswaraswamy et al. | |
| 2013/0206514 A1* | 8/2013 | Kim | B66B 9/025 187/240 |
| 2014/0103749 A1 | 4/2014 | Chang et al. | |
| 2015/0307325 A1* | 10/2015 | Fargo | B66B 11/0438 187/250 |
| 2015/0353321 A1* | 12/2015 | Fargo | B66B 5/02 187/276 |
| 2016/0046464 A1* | 2/2016 | Piech | B66B 9/003 187/249 |
| 2016/0083225 A1* | 3/2016 | Piech | H02K 41/031 187/250 |
| 2016/0083226 A1* | 3/2016 | Piech | B66B 11/0407 187/250 |
| 2016/0090275 A1* | 3/2016 | Piech | H02K 41/031 187/250 |
| 2016/0137459 A1* | 5/2016 | Rodriguez | B66B 11/0407 187/250 |
| 2016/0297640 A1* | 10/2016 | Witczak | B66B 11/0407 |
| 2016/0297646 A1* | 10/2016 | Piech | B66B 7/021 |
| 2016/0297648 A1* | 10/2016 | Witczak | B66B 9/003 |
| 2016/0304316 A1* | 10/2016 | Witczak | B66B 9/003 |
| 2016/0304317 A1* | 10/2016 | Witczak | B66B 11/04 |
| 2017/0015526 A1* | 1/2017 | Fargo | H02K 41/031 |
| 2017/0088396 A1* | 3/2017 | Fargo | B66B 9/003 |
| 2017/0240385 A1* | 8/2017 | Fargo | B66B 1/36 |
| 2017/0355568 A1* | 12/2017 | Schmidt | H02K 1/12 |
| 2018/0009637 A1* | 1/2018 | Krishnamurthy | H01L 25/072 |
| 2018/0022573 A1* | 1/2018 | Hsu | B66B 9/00 187/247 |
| 2018/0022574 A1* | 1/2018 | Pasini | B66B 11/0045 187/247 |
| 2018/0022575 A1* | 1/2018 | Ginsberg | B66B 5/0018 187/247 |
| 2018/0022576 A1* | 1/2018 | Jiang | B66B 1/306 187/297 |
| 2018/0215587 A1* | 8/2018 | Ranjan | B66B 11/0407 |
| 2018/0229971 A1* | 8/2018 | Ranjan | B66B 11/0407 |
| 2018/0327228 A1* | 11/2018 | Rasanen | B66B 11/009 |
| 2018/0327230 A1* | 11/2018 | Rasanen | H02K 11/33 |
| 2019/0010016 A1* | 1/2019 | Witczak | B66B 5/0018 |

FOREIGN PATENT DOCUMENTS

| | | |
|---|---|---|
| JP | H0881158 A | 3/1996 |
| JP | H09227038 A | 9/1997 |
| JP | H1080129 A | 3/1998 |
| WO | 2014081407 A1 | 5/2014 |

OTHER PUBLICATIONS

International Search Report for application No. PCT/US2016/045748 dated Nov. 29, 2016; 6 pages.
Written Opinion of the International Searching Authority for application No. PCT/US2016/045748 dated Nov. 29, 2016; 5 pages.

* cited by examiner

ELEVATOR LINEAR PROPULSION SYSTEM WITH COOLING DEVICE

CROSS-REFERENCES TO RELATED APPLICATIONS

This patent application is a U.S. National Stage Application of PCT/US2016/045748, filed Aug. 5, 2016, which claims the priority of U.S. Provisional Application No. 62/202,515, filed Aug. 7, 2015, each of which are incorporated herein by reference in their entirety.

BACKGROUND

The subject matter disclosed herein relates generally to the field of elevators, and more particularly to a multicar, self-propelled elevator system having a cooled linear propulsion system.

Self-propelled elevator systems, also referred to as ropeless elevator systems, are useful in certain applications (e.g., high rise buildings) where the mass of the ropes for a roped system is prohibitive and there is a desire for multiple elevator cars to travel in a single lane. There exist self-propelled elevator systems in which a first lane is designated for upward traveling elevator cars and a second lane is designated for downward traveling elevator cars. At least one transfer station is provided in the hoistway to move cars horizontally between the first lane and second lane.

Existing self-propelled elevators employ linear motors having primary portions that include stator coils engaged to a support structure. Duty cycle loads between coils and/or coil modules may vary from two percent to an excess of thirty percent depending upon the car speed and location within the hoistway. Because the duty cycle varies, the coils dissipate spatially varying heat loads in the hoistway causing a variance in coil efficiency and useful life from one coil to the next. Improvements in coil cooling is desirable.

SUMMARY

An elevator system according to one, non-limiting, embodiment of the present disclosure includes an elevator car constructed and arranged to travel in a hoistway; and a linear propulsion system configured to impart force to the elevator car, the linear propulsion system including; a first primary portion including a mounting assembly, a plurality of coils engaged to the mounting assembly, and a first cooling device including at least one conduit loop at least partially embedded in the mounting assembly for flowing cooling fluid.

Additionally to the foregoing embodiment, the linear propulsion system includes a secondary portion mounted to the elevator car and including a plurality of magnets.

In the alternative or additionally thereto, in the foregoing embodiment, the at least one conduit loop is partially embedded in a panel of the mounting assembly supporting the plurality of coils.

In the alternative or additionally thereto, in the foregoing embodiment, the at least one conduit loop is partially in a cavity defined at least in part by a panel of the mounting assembly that supports the coils disposed in the cavity.

In the alternative or additionally thereto, in the foregoing embodiment, the at least one conduit loop is made of a material having a coefficient of thermal conductivity that is about greater than 100 watts per meter kelvin.

In the alternative or additionally thereto, in the foregoing embodiment, the elevator system includes a rail disposed in and extending along the hoistway, and wherein the mounting assembly is engaged to the rail and the first cooling device includes a plurality of cooling fins projecting outward from the rail into the hoistway with the at least one conduit loop extending through each one of the plurality of cooling fins.

In the alternative or additionally thereto, in the foregoing embodiment, each one of the plurality of cooling fins substantially extend vertically.

In the alternative or additionally thereto, in the foregoing embodiment, the first cooling device includes a pump interposed in the at least one conduit loop for driving the cooling fluid flow.

In the alternative or additionally thereto, in the foregoing embodiment, the cooling device includes a plurality of cooling fins located outside of the hoistway with the at least one conduit loop extending through each one of the plurality of cooling fins.

In the alternative or additionally thereto, in the foregoing embodiment the elevator system includes a rail disposed in and extending along the hoistway, and wherein the mounting assembly includes an electrically non-conductive panel engaged to the plurality of coils and a bracket engaged between the non-conductive panel and the rail with the at least one conduit loop partially embedded in the bracket.

In the alternative or additionally thereto, in the foregoing embodiment, the cooling device includes a heat exchanger interposed with the at least one conduit loop.

In the alternative or additionally thereto, in the foregoing embodiment, the heat exchanger is located outside of the hoistway.

In the alternative or additionally thereto, in the foregoing embodiment, the heat exchanger is a liquid-to-liquid heat exchanger.

In the alternative or additionally thereto, in the foregoing embodiment, the heat exchanger is a liquid-to-air heat exchanger and the cooling device includes a fan for moving air through the heat exchanger.

In the alternative or additionally thereto, in the foregoing embodiment the elevator system includes a second primary portion including a second cooling device including a plurality of heat pipes.

In the alternative or additionally thereto, in the foregoing embodiment the elevator system includes a second primary portion including a second cooling device including a plurality of solid conduits constructed and arranged to transfer heat conductively.

An elevator linear propulsion system according to another, non-limiting, embodiment includes a substantially vertical rail; a first primary portion including a plurality of first electrical coils, a first mounting assembly, and a first cooling device including a plurality of solid conduits constructed and arranged to conduct heat out of the first mounting assembly; and a second primary portion including a plurality of second electrical coils, a second mounting assembly, and a second cooling device including at least one conduit loop for flowing cooling fluid, and wherein the at least one conduit loop extends partially through the mounting assembly for cooling the mounting assembly.

Additionally to the foregoing embodiment, the first and second primary portions are modular portions distributed along the rail.

In the alternative or additionally thereto, in the foregoing embodiment, the first primary portion includes a duty cycle of about less than thirty percent and the second primary portion includes a duty cycle of about greater than thirty percent.

In the alternative or additionally thereto, in the foregoing embodiment, the distribution of the first and second cooling devices is a function of elevator car duty cycle.

A method of operating an elevator system according to another, non-limiting, embodiment includes operating an elevator car via a first primary portion having a duty cycle of greater than thirty percent; and flowing cooling fluid through a conduit loop of a first cooling device for cooling electrical coils of the first primary portion.

Additionally to the foregoing embodiment, the method includes operating an elevator car via a second primary portion having a duty cycle of less than thirty percent; and reducing temperature of a support assembly constructed and arrange to support electrical coils of the second primary portion via heat conduction through a plurality of conduits of a second cooling device.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
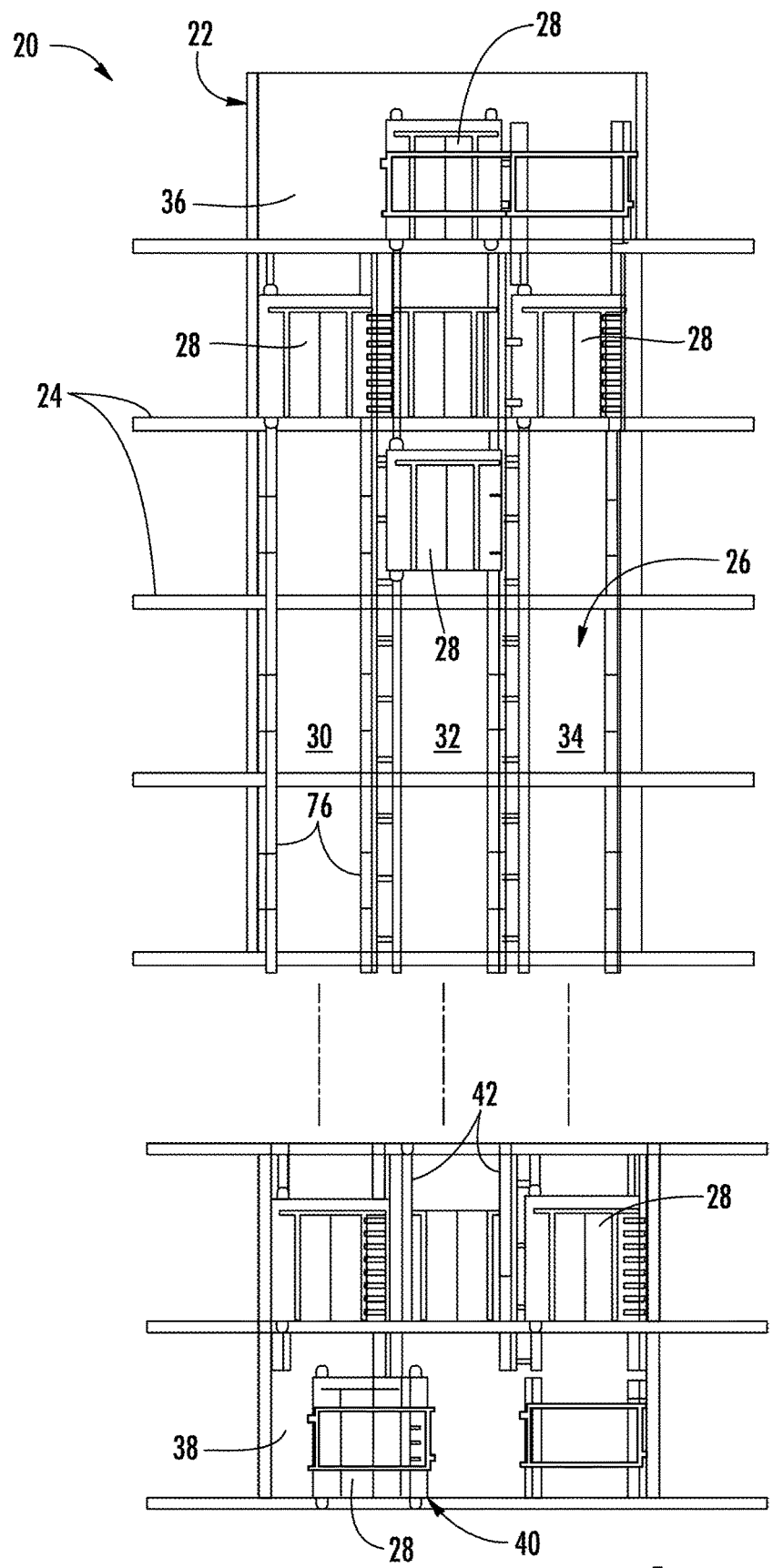
FIG. 1 depicts a multicar elevator system in an exemplary embodiment.

FIG. 1 depicts a self-propelled or ropeless elevator system 20 in an exemplary embodiment that may be used in a structure or building 22 having multiple levels or floors 24. Elevator system 20 includes a hoistway 26 having boundaries defined by the structure 22 and at least one car 28 adapted to travel in the hoistway 26. The hoistway 26 may include, for example, three lanes 30, 32, 34 with any number of cars 28 traveling in any one lane and in any number of travel directions (e.g., up and down). For example and as illustrated, the cars 28 in lanes 30, 34, may travel in an up direction and the cars 28 in lane 32 may travel in a down direction.

Above the top floor 24 may be an upper transfer station 36 that facilitates horizontal motion to elevator cars 28 for moving the cars between lanes 30, 32, 34. Below the first floor 24 may be a lower transfer station 38 that facilitates horizontal motion to elevator cars 28 for moving the cars between lanes 30, 32, 34. It is understood that the upper and lower transfer stations 36, 38 may be respectively located at the top and first floors 24 rather than above and below the top and first floors, or may be located at any intermediate floor. Yet further, the elevator system 20 may include one or more intermediate transfer stations (not illustrated) located vertically between and similar to the upper and lower transfer stations 36, 38.

Figure 2:
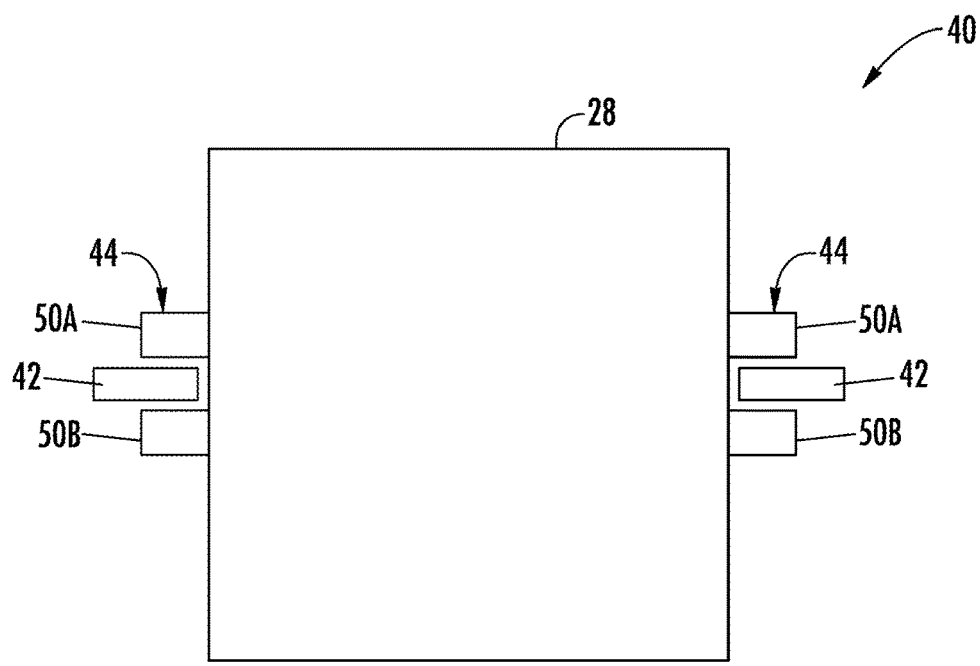
FIG. 2 is a top down view of a car and portions of a linear propulsion system in an exemplary embodiment.
Figure 3:
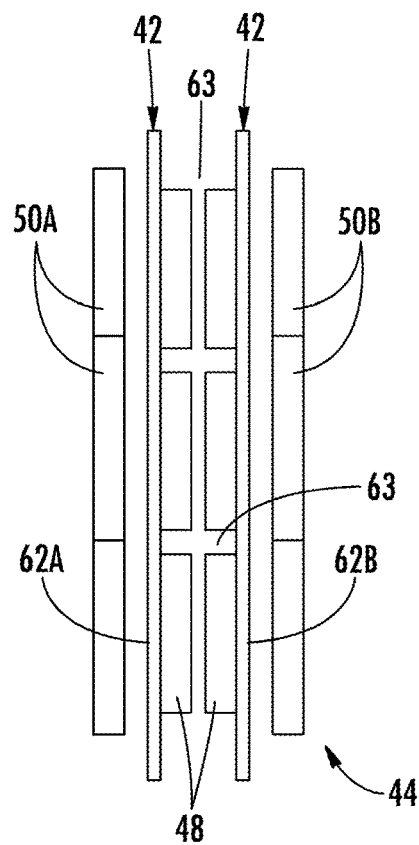
FIG. 3 is a front view of portions of a linear propulsion system in an exemplary embodiment.
Figure 4:
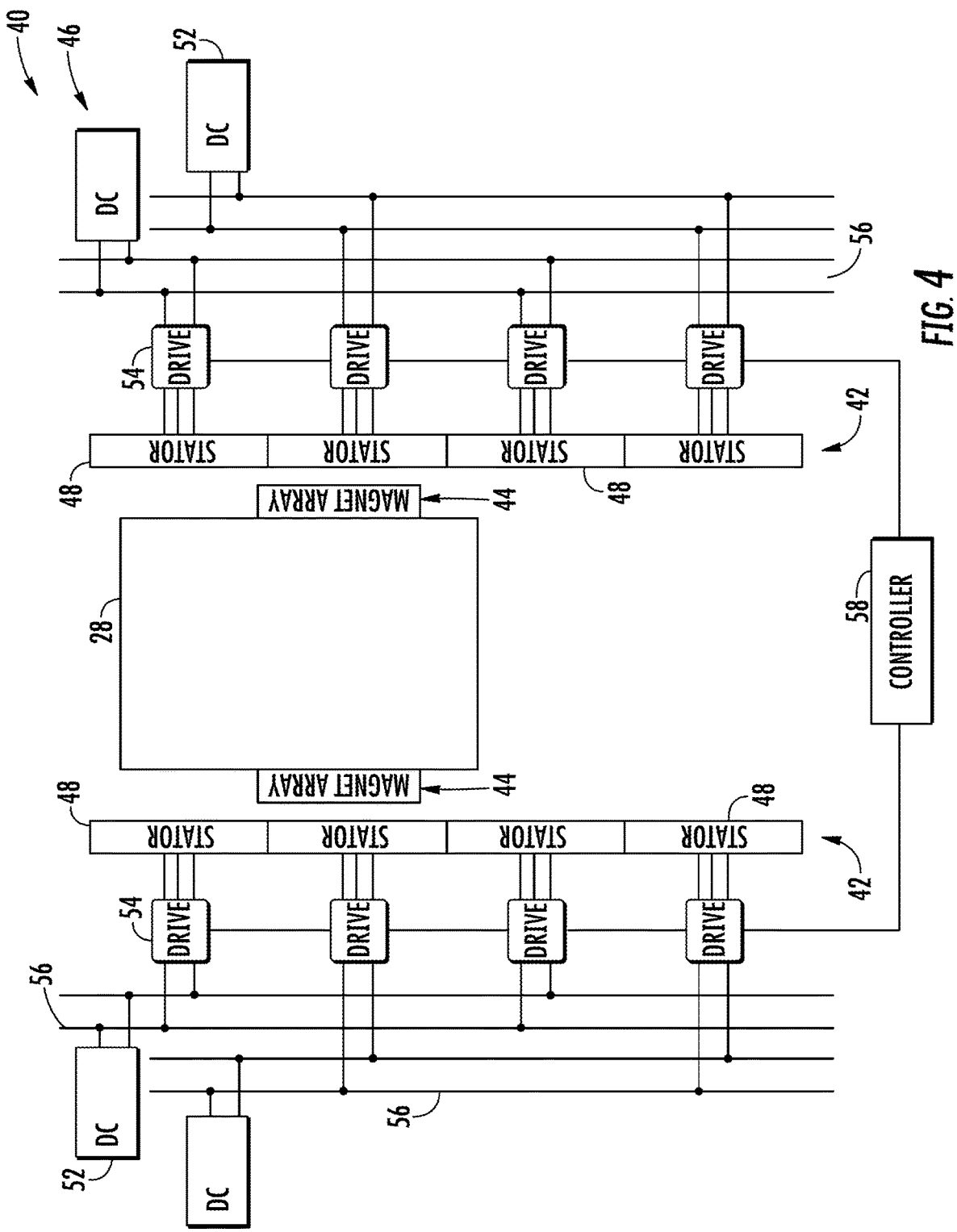
FIG. 4 is a schematic of the linear propulsion system.

Referring to FIGS. 1 through 3, cars 28 are propelled using a linear propulsion system 40 having a fixed, primary portion 42 (e.g., two illustrated in FIG. 2), a moving secondary portion 44 (e.g., two illustrated in FIG. 2), and a control system 46 (see FIG. 4). The primary portion 42 includes a plurality of windings or coils 48 mounted at one or both sides of the lanes 30, 32, 34 in the hoistway 26. The secondary portion 44 may include two rows of permanent magnets 50A, 50B mounted to one or both sides of cars 28. Primary portion 42 is supplied with drive signals from the control system 46 to generate a magnetic flux that imparts a force on the secondary portion 44 to control movement of the cars 28 in their respective lanes 30, 32, 34 (e.g., moving up, down, or holding still). It is further contemplated and understood that the linear propulsion system 40 may be a synchronous reluctance linear motor with the secondary portion 44 being formed by a steel, ferromagnetic plate with saliency. Moreover, the linear propulsion system 40 may be an induction linear motor and may include a secondary portion 44 being formed by a steel, ferromagnetic, plate with a conductive sheet with a material made, for example, of aluminum, copper, and others.

Referring to FIGS. 2 and 3, a first secondary portion 44 of the linear propulsion system 40 is mounted on a first side of the car 28 and a second secondary portion 44 is mounted on an opposite side of the car 28. The primary portion 42 (which may be two, back-to-back, primary portions 42) is generally positioned between the magnets 50A, 50B of the secondary portion 44. It is contemplated and understood that any number of secondary portions 44 may be mounted to the car 28, and any number of primary portions 42 may be associated with the secondary portions 44 in any number of configurations.

Referring to FIG. 4, the control system 46 may include power sources 52, drives 54, buses 56 and a controller 58. The power sources 52 are electrically coupled to the drives 54 via the buses 56. In one non-limiting example, the power sources 52 may be direct current (DC) power sources. DC power sources 52 may be implemented using storage devices (e.g., batteries, capacitors), and may be active devices that condition power from another source (e.g., rectifiers). The drives 54 may receive DC power from the buses 56 and may provide drive signals to the primary portions 42 of the linear propulsion system 40. Each drive 54 may be an inverter that transforms DC power from bus 56 to a multiphase (e.g., three phase) drive signal provided to a respective section of the primary portions 42. The primary portion 42 is divided into a plurality of modules or sections, with each section associated with a respective drive 54.

The controller 58 provides control signals to each of the drives 54 to control generation of the drive signals. Controller 58 may use pulse width modulation (PWM) control signals to control generation of the drive signals by drives 54. Controller 58 may be implemented using a processor-based device programmed to generate the control signals. The controller 58 may also be part of an elevator control system or elevator management system. Elements of the control system 46 may be implemented in a single, integrated module, and/or be distributed along the hoistway 26.

Figure 5:
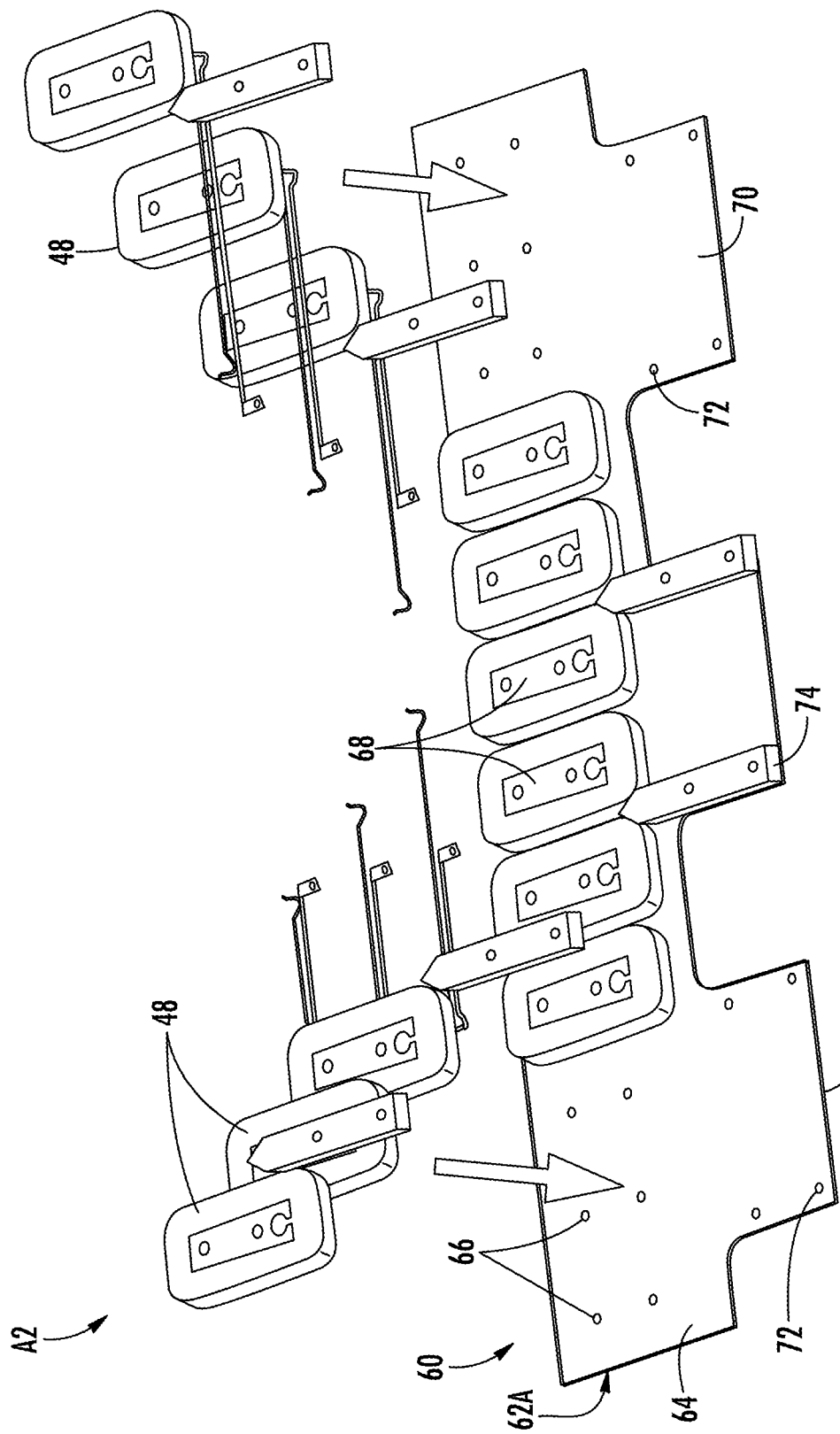
FIG. 5 is a partial exploded view of a primary portion of the linear propulsion system.
Figure 6:
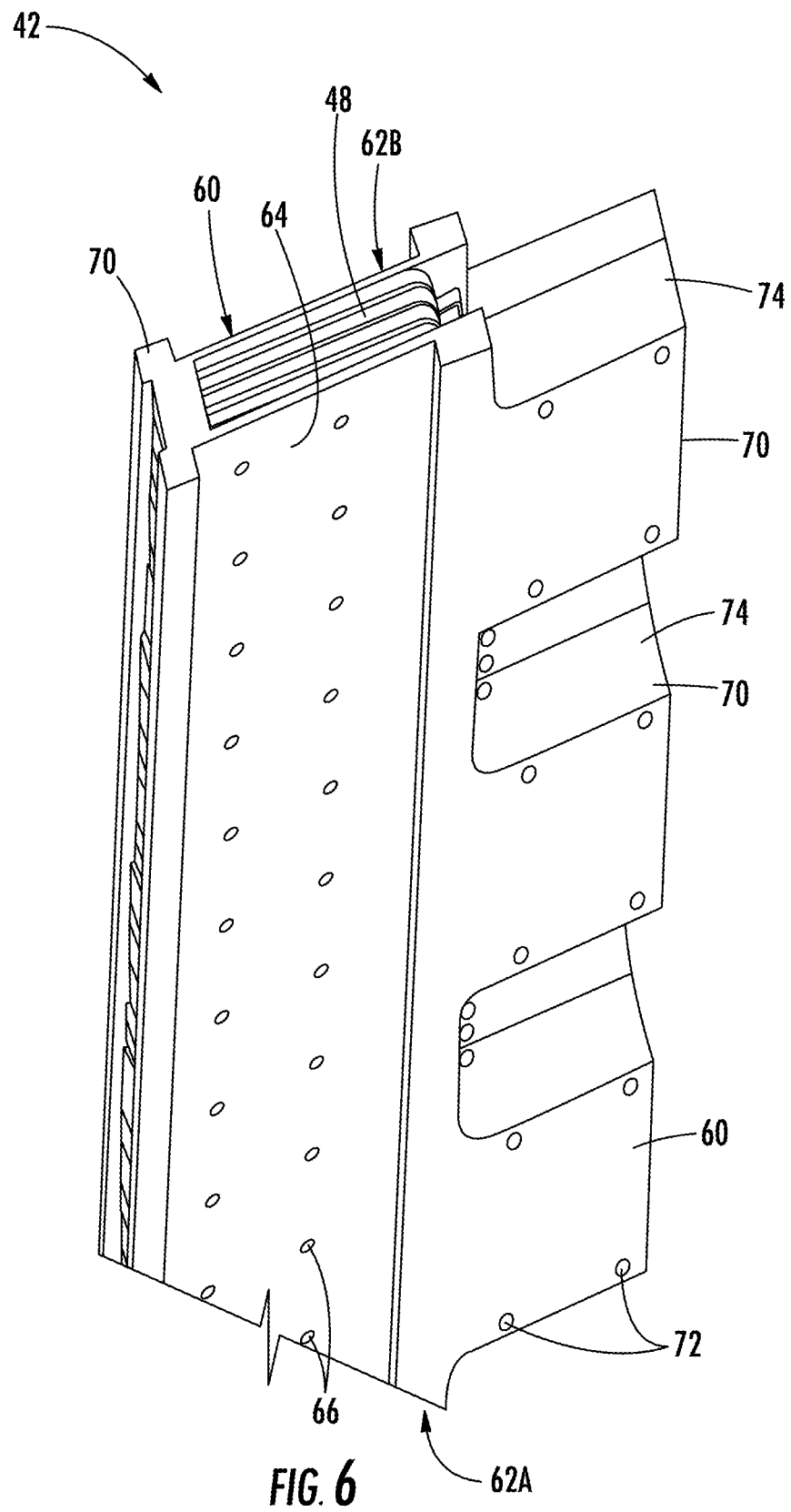
FIG. 6 is a partial perspective view of the primary portion.

Referring to FIGS. 3, 5 and 6, the primary portion 42 may include a mounting assembly 60 that supports the coils 48. The mounting assembly 60 may include two panels 62A, 62B that generally define the boundaries of a cavity 63 there-between with the coils 48 located in the cavity 63. Each panel 62A, 62B may include a substantially planar base 64 that may be generally rectangular with a plurality of mounting holes 66 formed therein. Coil cores 68 of the mounting assembly 60 support the coils 48, and may be secured to the base 64 at the mounting holes 66 via fasteners (not shown). The panel 62 and the coil cores 68 may be made from a non-conductive material, such as fiberglass, plastic, fiber reinforced plastic, and other non-magnetic materials. However, metallic inserts and/or fluid coolant flow conduits may be present in the panels 62A, 62B and coil cores.

One or more flanges 70 of each panel 62A, 62B may be located co-planar too, and extend from, the respective bases 64. Each flange 70 may include mounting holes 72 for securing spacers 74 of the mounting assembly 60 at outer edges of the flanges 70 using fasteners (not shown). When assembled, the flanges 70 with the spacers 74 generally define and maintain a width of the cavity 63 to accommodate electrical wiring to the coils 48 of the primary portion 42. The flanges 70 may also provide desired rigidity for the primary portion 42.

Figure 7:
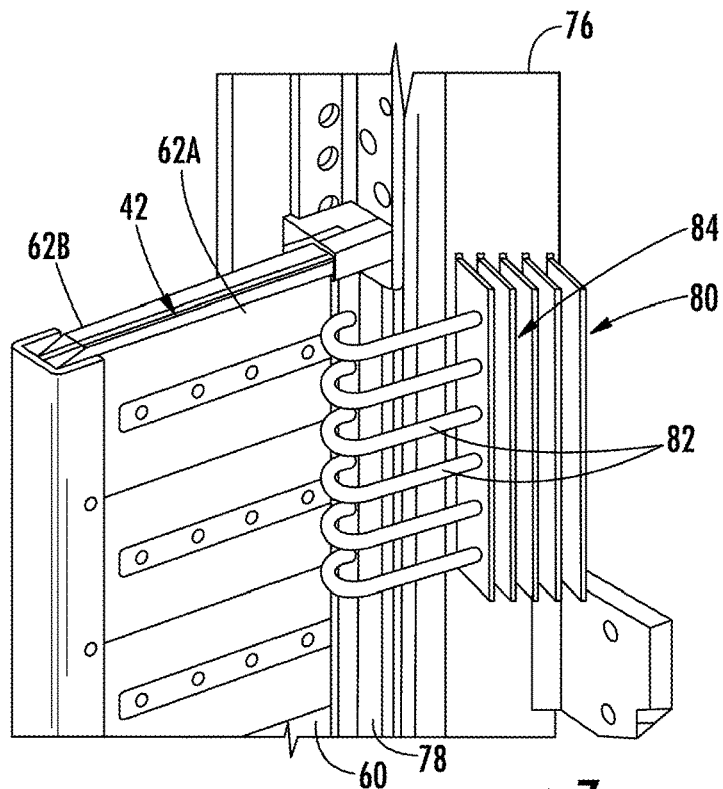
FIG. 7 is a partial perspective view of the linear propulsion system illustrating a cooling device of the primary portion.

Referring to FIGS. 1, 6 and 7, the linear propulsion system 40 of the elevator system 20 may further include a rail 76 and the mounting assembly 60 of the primary portion 42 may further include a bracket 78 engaged between the panel 62 and the rail 76. As one non-limiting example, two rails 78 may respectively oppose opposite sides of the car 28, and may substantially extend vertically in each lane 30, 32, 34 of the hoistway 26. The brackets 78 of the mounting assemblies 60 of the back-to-back primary portions 48 may be secured to the rail 78. It is further contemplated and understood that each primary portion 48 of the two back-to-back primary portions 42 may generally share a common bracket that connects to the rail 78.

The primary portion 42 may be a modular unit of the linear propulsion system 40. The linear propulsion system 40 may include a plurality of modular primary portions 42 generally aligned top to bottom along the common rail 76 that may extend along the entire vertical height of the respective lane 30, 32, 34. The coils 48 of each primary portion 42 may be driven by a single, respective drive 54. In other embodiments, a drive 54 may provide drive signals to coils 48 in multiple primary portions 42. The modular nature of the primary portions 42 facilitates installation of the primary portions 42 along the length of the rail 76 in the hoistway 26. Installers need only to handle the modular primary portions 42, which are less cumbersome than more traditional designs. It is further understood and contemplated that various configurations and numbers of the primary portions 42 and components thereof may constitute a modular unit.

Referring to FIG. 7, the primary portion 42 may include a cooling device 80 for cooling the electrical coils 48 to improve electrical efficiency and prolong the useful life of the coils. The cooling device 80 may be of a natural or forced convection air cooling type (i.e., passive type), and may include a plurality of cooling conduits 82 (e.g., six illustrated) and a plurality of cooling fins 84. The fins 84 may be supported by and project outward from the rail 76, and the conduits 82 generally project outward from the bracket 78 and may extend through the fins for improved heat transfer via heat conduction from the conduits 82 into the fins 84, and heat convection from the fins and into the surrounding air. The fins 84 may generally be elongated and substantially extend longitudinally and vertically to take advantage of natural convection and vertical air drafts within the hoistway.

Figure 8:
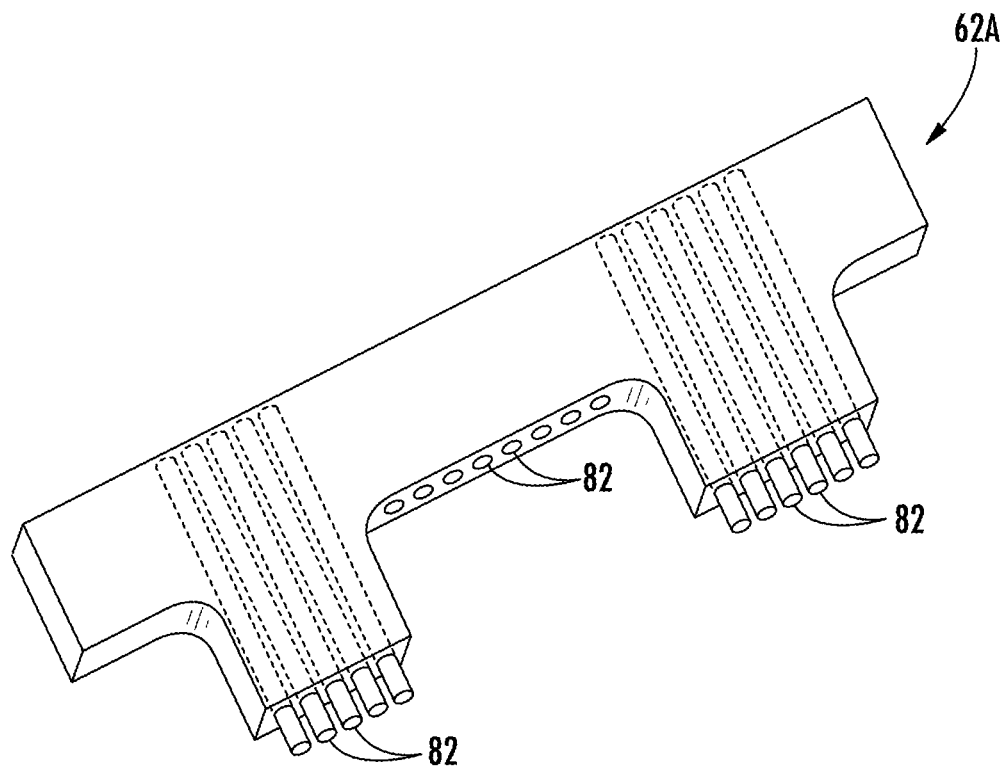
FIG. 8 is a perspective view of a panel of the primary portion illustrating conduits of the cooling device of FIG. 7.

Referring to FIG. 8, the conduits 82 may be at least partially embedded in one or both of the panels 62A, 62B of the mounting assembly 60. It is further contemplated and understood that the conduits 82 may also be routed between the panels 62A, 62B and in the cavity 63 that generally surrounds the coils 48 of the primary portion 42 (also see FIG. 3).

The conduits 82 may be heat pipes, as is traditionally known in the art, that may include a center vapor cavity, a surrounding wick, and an outer casing (not shown). In operation, a working fluid in the cavity absorbs thermal energy and is vaporized. The vapor migrates along the cavity to a lower temperature end (e.g., at the fins 84). The vapor then condenses back to fluid and is absorbed by the wick releasing thermal energy through the casing. The fluid then flows back to the higher temperature end (e.g., at the bracket 78). It is further contemplated and understood that other varieties of heat pipes as is known in the art may apply. Whether the conduits are heat pipes or more passive and solid conduits, the conduits 82 may be generally made of a material having a coefficient of thermal conductivity that is about greater than 100 watts per meter kelvin. Non-limiting examples of such materials may include bronze, aluminum, copper and others. Moreover, lower conductivity metals (e.g., steel at about 50 W/mK) may also be used.

Figure 9:
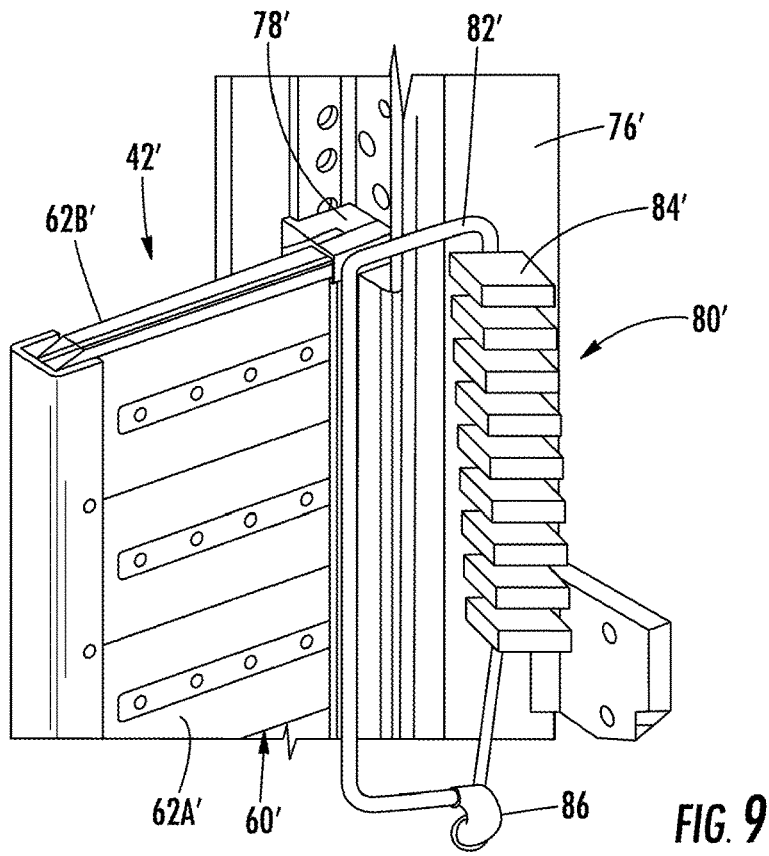
FIG. 9 is a partial perspective view of a second embodiment of the primary portion.

Referring to FIG. 9, a second embodiment of a primary portion is illustrated wherein like elements have like identifying numerals except with the addition of a prime symbol. A primary portion 42' may include a cooling device 80' for cooling electrical coils of primary portion 42' to improve electrical efficiency and prolong the useful life of the coils. The cooling device 80' may be of an active type, and may include at least one cooling, hollow, conduit or tube 82' (e.g., one illustrated as a flowing liquid loop) for flowing fluid, a fluid pump 86 for driving the flow of fluid, and a plurality of cooling fins 84'. The fins 84' may be supported by and project outward from the rail 76, and a portion of the tube 82' may be embedded in or formed by a bracket 78' with another portion generally routed through the fins 84' for improved heat transfer into the surrounding air. Although not illustrated, the cooling device 80' may further include temperature sensors to measure fluid temperature that receives signals from the fluid temperature and controls the speed and/or actuation of the pump 86. Moreover, the fins 84' may be further cooled via a fan or blower (not shown) located in the hoistway and configured to drive air flow through the fins 84'.

Figure 10:
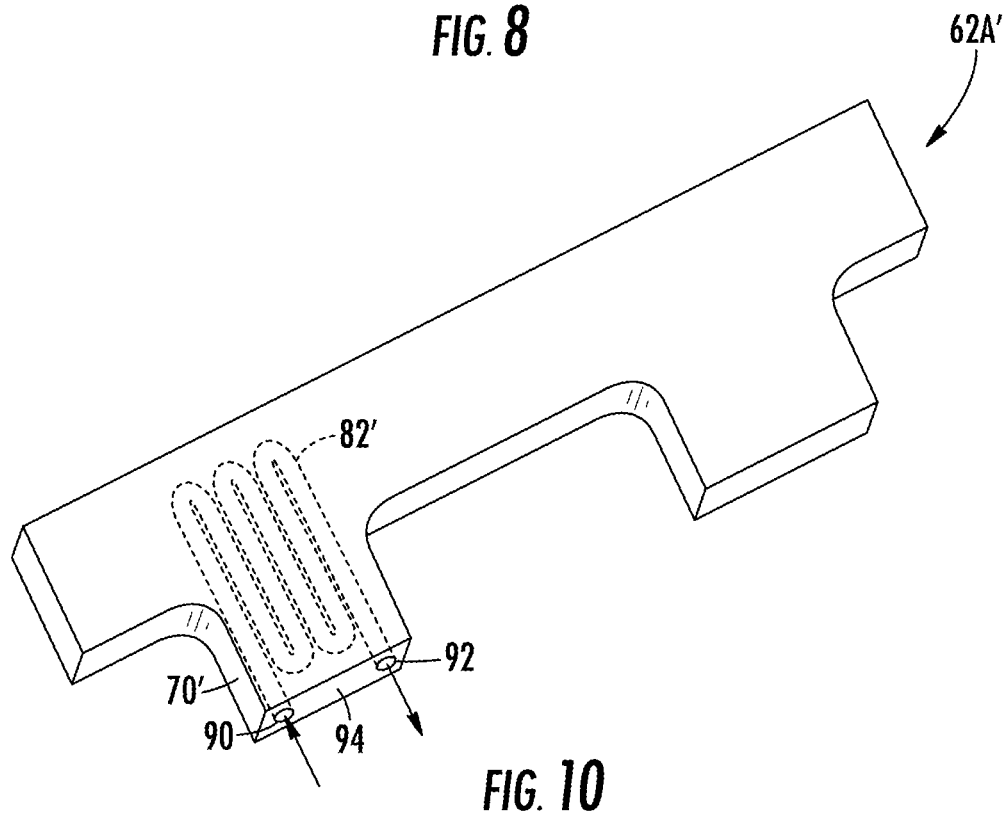
FIG. 10 is a perspective view of a panel of the primary portion illustrating conduits of the cooling device of FIG. 9.

Referring to FIG. 10, the conduits 82' may be at least partially embedded in one or both of the panels 62A', 62B' of the mounting assembly 60', such that coolant flow enters the panel 62A' via a conduit inlet 90 and exits the panel 62A' via a conduit outlet 92 that may be defined and carried by an outer face 94 of a flange 70' of the panel 62A'. It is further contemplated and understood that the conduits 82' may also be routed between the panels 62A', 62B' and in the cavity 63' that generally surrounds the coils 48' of the primary portion 42' (also see FIG. 3).

Figure 11:
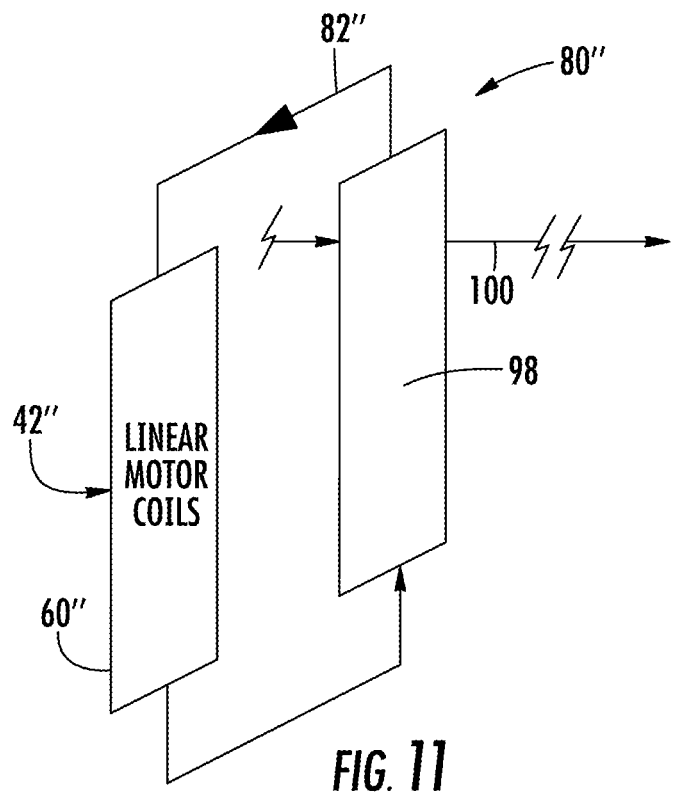
FIG. 11 is a schematic of a third embodiment of a cooling device.

Referring to FIG. 11, a third embodiment of a cooling device is illustrated wherein like elements to the first and/or second embodiments have like identifying numerals except with the addition of a double prime suffix. A cooling device 80" may include a conduit 82" that may be a primary coolant loop that circulates a cooling fluid generally through a mounting assembly 60" of a linear motor primary portion 42" and a liquid-to-liquid heat exchanger 98. A secondary coolant loop 100 may flow fluid through the heat exchanger 98 thereby receiving heat from the cooling fluid flowing through the primary coolant loop 82". The heat exchanger 98 may be located in or outside of the hoistway 26. The secondary coolant loop 100 may be constructed and arranged to transfer heat into, for example, a building water heating system.

Figure 12:
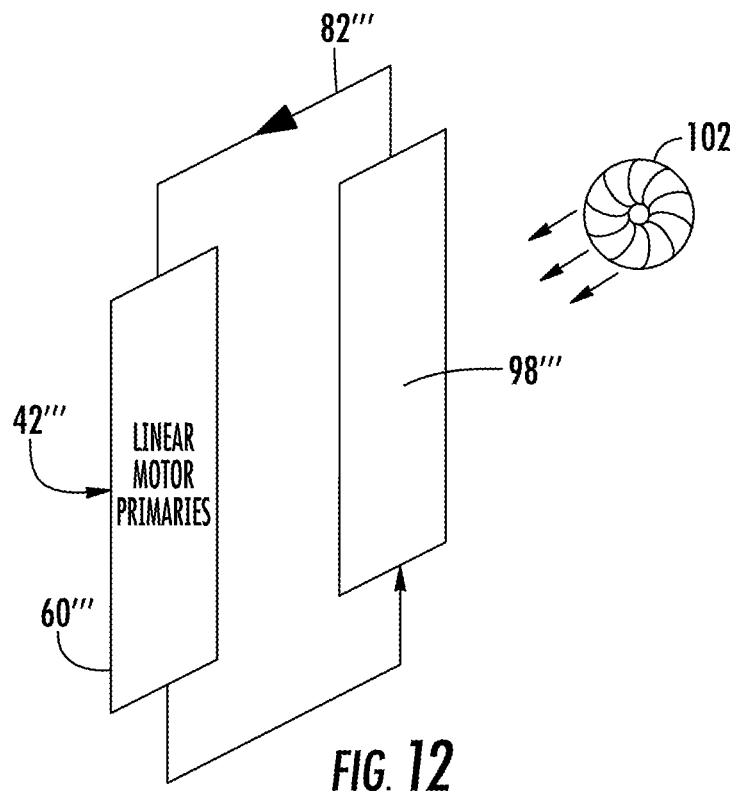
FIG. 12 is a schematic of a fourth embodiment of a cooling device.

Referring to FIG. 12, a fourth embodiment of a cooling device is illustrated wherein like elements to the first and/or second embodiments have like identifying numerals except with the addition of a triple prime suffix. A cooling device 80''' may include a conduit 82''' that may be a primary coolant loop that circulates a cooling fluid generally through a mounting assembly 60''' of a linear motor primary portion 42''' and a liquid-to-air heat exchanger 98'''. A fan or blower 102 may drive cooling air through the heat exchanger 98''' thereby removing heat (i.e., forced air convection) from the cooling fluid flowing through the primary coolant loop 82'''. The heat exchanger 98''' may be located in or outside of the hoistway 26.

The linear propulsion system 40 may include at least one primary portion 42 (see FIG. 7) with the passive cooling device 80 and at least one primary portion 42' with the active cooling device 80' (see FIG. 9) along with variations thereof (e.g., cooling devices without fins, with heat exchangers, or others). The primary portion 42 may be considered as a low duty cycle portion or having a duty cycle of about less than thirty percent, and the primary portion 42' may be considers as a high duty cycle portion or having a duty cycle of about greater than thirty percent. The greater the duty cycle, the greater is the heat produced by the coils and thus the greater is the need to transfer heat away from the coils to improve electrical efficiency and coil life. The primary portions 42, 42' may be distributed along the rail 76 indicative of the expected duty cycle at a specific location. Different duty cycles may be realized in the hoistway based on car speed and lobby level loading. Moreover, the materials used in the coils (e.g. aluminum, copper, and others) will influence rate of coil temperature increase. It is further contemplated and understood that the distribution of cooling devices 80, 80' (i.e. passive and/or active) may be a function of elevator duty cycle.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An elevator system, comprising:
    an elevator car constructed and arranged to travel in a hoistway; and
    a linear propulsion system configured to impart force to the elevator car, the linear propulsion system including;
        a first primary portion including a mounting assembly, a plurality of coils engaged to the mounting assembly, and
        a first cooling device including at least one conduit loop at least partially embedded in the mounting assembly for flowing cooling fluid.

2. The elevator system set forth in claim 1, wherein the linear propulsion system includes a secondary portion mounted to the elevator car and including a plurality of magnets.

3. The elevator system set forth in claim 1, wherein the at least one conduit loop is partially embedded in a panel of the mounting assembly supporting the plurality of coils.

4. The elevator system set forth in claim 1, wherein the at least one conduit loop is partially in a cavity defined at least in part by a panel of the mounting assembly that supports the coils disposed in the cavity.

5. The elevator systems set forth in claim 1, wherein the at least one conduit loop is made of a material having a coefficient of thermal conductivity that is about greater than 100 watts per meter kelvin.

6. The elevator system set forth in claim 1 further comprising:
    a rail disposed in and extending along the hoistway, and wherein the mounting assembly is engaged to the rail and the first cooling device includes a plurality of cooling fins projecting outward from the rail into the hoistway with the at least one conduit loop extending through each one of the plurality of cooling fins.

7. The elevator system set forth in claim 6, wherein each one of the plurality of cooling fins substantially extend vertically.

8. The elevator system set forth in claim 1, wherein the first cooling device includes a pump interposed in the at least one conduit loop for driving the cooling fluid flow.

9. The elevator system set forth in claim 1, wherein the cooling device includes a plurality of cooling fins located outside of the hoistway with the at least one conduit loop extending through each one of the plurality of cooling fins.

10. The elevator system set forth in claim 1 further comprising:
    a rail disposed in and extending along the hoistway, and wherein the mounting assembly includes an electrically non-conductive panel engaged to the plurality of coils and a bracket engaged between the non-conductive panel and the rail with the at least one conduit loop partially embedded in the bracket.

11. The elevator system set forth in claim 1, wherein the cooling device includes a heat exchanger interposed with the at least one conduit loop.

12. The elevator system set forth in claim 11, wherein the heat exchanger is located outside of the hoistway.

13. The elevator system set forth in claim 11, wherein the heat exchanger is a liquid-to-liquid heat exchanger.

14. The elevator system set forth in claim 11, wherein the heat exchanger is a liquid-to-air heat exchanger and the cooling device includes a fan for moving air through the heat exchanger.

15. The elevator system set forth in claim 1 further comprising:
   a second primary portion including a second cooling device including a plurality of heat pipes.

16. The elevator system set forth in claim 1 further comprising:
   a second primary portion including a second cooling device including a plurality of solid conduits constructed and arranged to transfer heat conductively.

17. An elevator linear propulsion system comprising: a substantially vertical rail;
   a first primary portion including a plurality of first electrical coils, a first mounting assembly, and a first cooling device including a plurality of solid conduits constructed and arranged to conduct heat out of the first mounting assembly; and
   a second primary portion including a plurality of second electrical coils, a second mounting assembly, and a second cooling device including at least one conduit loop for flowing cooling fluid, and wherein the at least one conduit loop extends partially through the mounting assembly for cooling the mounting assembly.

18. The elevator linear propulsion system set forth in claim 17, wherein the first and second primary portions are modular portions distributed along the rail.

19. The elevator linear propulsion system set forth in claim 18, wherein the first primary portion includes a duty cycle of about less than thirty percent and the second primary portion includes a duty cycle of about greater than thirty percent.

20. The elevator linear propulsion system set forth in claim 17, wherein the distribution of the first and second cooling devices is a function of elevator car duty cycle.

* * * * *